United States Patent Office 3,565,939
Patented Feb. 23, 1971

3,565,939
PARTIAL NEUTRALIZATION OF SULFATES
OF ETHOXYLATED ALCOHOLS
Arthur L. Beiser, Jackson Heights, N.Y., assignor to
Standard Chemical Products, Inc., Hoboken, N.J., a
corporation of New Jersey
No Drawing. Filed June 9, 1967, Ser. No. 644,798
Int. Cl. C07c 141/00, 141/02
U.S. Cl. 260—459                               4 Claims

ABSTRACT OF THE DISCLOSURE

This invention relates to partially neutralized liquid sulfuric acid esters of ethoxylated alcohols having improved stability produced by the process which comprises the steps of (A) adding in gaseous form from about 10% to about 55% of the theoretical for neutralization of an anhydrous neutralizing agent selected from the group of ammonia and alkyl amines having 1–3 carbon atoms and being gaseous at a temperature of 35° C. to an anhydrous sulfuric acid ester of an ethoxylated alcohol selected from the group consisting of (1) compounds of the formula $$R-CH_2-O-(CH_2-CH_2-O)_n-SO_3H$$

(2) compounds of the formula $$R'-O-(CH_2-CH_2-O)_n-SO_3H$$

(3) compounds of the formula $$R_1-CH-R_2$$
$$|$$
$$O-(CH_2-CH_2-O)_n-SO_3H$$

and (4) mixtures of the above;
wherein R represents a member selected from the group consisting of alkyl having from 5 to 19 carbon atoms, alkenyl having from 5 to 19 carbon atoms, and hydroxyalkyl having from 5 to 19 carbon atoms; R' represents alkylaryl having from 7 to 24 carbon atoms; $R_1$ and $R_2$ represent alkyl having from 1 to 18 carbon atoms and the total of the carbon atoms in $R_1$ and $R_2$ is from 5 to 19; and $n$ represents an integer of from 2 to 17; at a temperature below 125° C.; and (B) recovering said liquid sulfuric acid esters of ethoxylated alcohols having improved stability.

THE PRIOR ART

Sulfates of ethoxylated alcohols are extensively utilized in the formulation of synthetic detergents. Previously these sulfates were prepared in the form of their alkali metal or ammonium salts in solution in water or other solvent and then dried. These materials suffer the drawback that they are already neutralized and are, therefore, difficultly formulated where other sulfate salts are desired. Moreover, the extra steps of neutralizing in solution and drying are required. As a method of avoiding these extra costs, it has been attempted to market the sulfuric acid esters of ethoxylated alcohols without neutralization. However, these sulfuric acid esters are extremely sensitive to the presence of moisture and even when kept in anhydrous condition, they readily break down on only short periods of storage at room temperatures. This breakdown is even more serious where the temperatures are elevated as in warehousing during the summer months or where moisture is present.

OBJECTS OF THE INVENTION

An object of the present invention is the development of a process for the improvement of the stability of liquid sulfuric acid esters of ethoxylated alcohols.

A further object of the present invention is the obtaining of partially neutralized liquid sulfuric acid esters of ethoxylated alcohols having improved stability produced by the process which comprises the steps of (A) adding in gaseous form from about 10% to about 55% of the theoretical for neutralization of an anhydrous neutralizing agent selected from the group of ammonia and alkyl amines having 1–3 carbon atoms and being gaseous at a temperature of 35° C. to an anhydrous sulfuric acid ester of an ethoxylated alcohol selected from the group consisting of (1) compounds of the formula $$R-CH_2-O-(CH_2-CH_2-O)_n-SO_3H$$

(2) compounds of the formula $$R'-O-(CH_2-CH_2-O)_n-SO_3H$$

(3) compounds of the formula $$R_1-CH-R_2$$
$$|$$
$$O-(CH_2-CH_2-O)_n-SO_3H$$

and (4) mixtures of the above;
wherein R represents a member selected from the group consisting of alkyl having from 5 to 19 carbon atoms, alkenyl having from 5 to 19 carbon atoms, and hydroxyalkyl having from 5 to 19 carbon atoms; R' represents alkylaryl having from 7 to 24 carbon atoms; $R_1$ and $R_2$ represent alkyl having from 1 to 18 carbon atoms and the total of the carbon atoms in $R_1$ and $R_2$ is from 5 to 19; and $n$ represents an integer of from 2 to 17; at a temperature below 125° C.; and (B) recovering said liquid sulfuric acid esters of ethoxylated alcohols having improved stability.

These and other objects of the invention will become more apparent as the description thereof proceeds.

DESCRIPTION OF THE INVENTION

It has now been discovered that the shelf stability of liquid sulfuric acid esters of ethoxylated alcohols can be greatly improved if the acid esters are partially neutralized with from about 10% to about 55% of the theoretical amount required for neutralization of ammonia or a gaseous amine.

The amount of ammonia or gaseous amine to be added for the partial neutralization is critical. If less than 10% of the theoretical amount for complete neutralization is added, little if any, improvement in shelf stability is had, particularly against hydrolysis at elevated temperatures. If over 55% of the theoretical for complete neutralization is added, the resultant product sets up in the form of a paste at room temperatures, which is difficult to handle and to dissolve. Moreover, the more complete the neutralization of the sulfuric acid esters of ethoxylated alcohols, the more difficult they are to incorporate into detergent composition formulations. Preferably the liquid sulfuric acid ester of ethoxylated alcohols should be partially neutralized to the extent of between 15% and 30% of the theoretical for optimum shelf stability coupled with optimum ease in formulation in detergent compositions.

Sulfuric acid esters of ethoxylated alcohols are commercial products utilized primarily as surface active agents in detergent formulations. They are prepared by sulfation of ethoxylated alcohols with sulfation agents such as $H_2SO_4$, $SO_3$ and chlorosulfonic acid. Preferably, chlorosulfonic acid is utilized and the ethoxylated alcohol and chlorosulfonic acid are mixed under anhydrous conditions at ambient temperatures. The by-product hydrochloric acid is substantially removed by passing air through the sulfated material. A process of preparing such sulfuric acid esters of ethoxylated alcohols is described in the copending, commonly assigned U.S. patent application Ser. No. 523,036, filed Jan. 26, 1966 now Pat. No. 3,413,331.

The sulfuric acid esters of ethoxylated alcohols are preferably those having the following formulas:

(1) $R-CH_2-O-(CH_2-CH_2-O)_n-SO_3H$ (2) $R'-O-(CH_2-CH_2-O)_n-SO_3H$ (3) 
$$R_1-CH-R_2$$
$$|$$
$$O-(CH_2-CH_2-O)_n-SO_3H$$

or mixtures of the above where R is alkyl having 5 to 19 carbon atoms, alkenyl having from 5 to 19 carbon atoms, and hydroxyalkyl having from 5 to 19 carbon atoms; R' is alkylaryl having from 7 to 24 carbon atoms; and $R_1$ and $R_2$ represent alkyl having from 1 to 18 carbon atoms, the total number of carbon atoms in $R_1$ and $R_2$ is from 5 to 19; and $n$ is an integer from 2 to 17. The esters of Formula 1 are derived from primary alcohols and are primarily aliphatic in nature. The esters of Formula 2 are derived from phenolic compounds and the esters of Formula 3 are derived from secondary alcohols which are likewise primarily aliphatic in nature. In addition to the individual esters of the three formulas, mixtures of several types of esters can be employed in the partial neutralization process of the invention.

The ethoxylated alcohols are prepared by conventional processes of ethoxylating such as reacting from about 2 to about 17 mols of ethylene oxide with about one mol of the alcohol, or mixtures of alcohols under custmary ethoxylation conditions.

Among the various sulfuric acid esters of alcohol ethoxylates are the following, expressed in terms of their alcohol moieties:

(1) The primary higher alcohol ethoxylates such as the commercial products "Alfonic 1014–4" (a mixture of $C_{10}$ to $C_{14}$ alcohols derived from petroleum containing 40% polyoxyethylene content or an average of 3 polyoxyethylene units); "Alfonic 810–6" (a mixture of $C_8$ to $C_{10}$ synthetic aliphatic alcohols containing 60% polyoxyethylene content or an average of 5.5 polyoxyethylene units); "Alfonic 1012–6" (a mixture of $C_{10}$ to $C_{12}$ synthetic aliphatic alcohols containing 60% polyoxyethylene content or an average of 5.25 polyoxyethylene units); a lauryl alcohol ethoxylated with about 3 polyoxyethylene units; polyethylene glycol alkenyl ethers, such as oleylpolyoxyethyl alcohol having about 5 polyoxyethylene units; and polyoxyethyleneglycol hydroxyalkyl ethers, such as 12-hydroxy-octadecylpolyoxyethyl alcohol having about 6 polyoxyethylene units.

(2) The phenolic alkylaryl ethoxylates such as alkylphenol ethoxylates and alkylnaphthol ethoxylates are, for example, an alkylphenol ethoxylate having an average of 4 polyoxyethylene units and an average of 9 carbon atoms in the alkyl portion of the molecule.

(3) The secondary alcohols are those having the formula

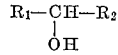

wherein $R_1$ and $R_2$ are alkyl having from 1 to 18 carbon atoms and the total of the carbon atoms in $R_1$ and $R_2$ is from 5 to 19, and preferably those having the formula

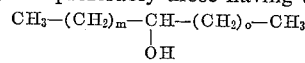

wherein $m$ is an integer of from 0 to 17, $o$ is an integer of from 0 to 17 and the sum of $m+o$ is an integer from 3 to 17. Preferable are straight chain secondary alcohols having from 10 to 15 carbon atoms which are commercially available. Branched chain secondary alcohols of the above formula are also utilizable however.

The secondary alcohol ethoxylates of the above secondary alcohols such as a straight chain secondary alcohol ethoxylate having from 11 to 15 carbon atoms in the alcohol moiety with an average of 4 polyoxyethylene units, and "Tergitol 15–S–3," a straight chain secondary alcohol ethoxylate having from 11 to 15 carbon atoms in the alcohol moiety with an average of 3 polyoxyethylene units.

The partial neutralization of the invention is preferably conducted by adding gaseous ammonia or an organic amine which is gaseous at a temperature of 35° C. to the anhydrous sulfuric acid ester of the ethoxylated alcohol under agitation. The neutralization reaction is exothermic and heating of the reaction components occurs. No cooling of the mixture is required under normal conditions even when the addition of the required amount of the gaseous neutralization agent is made rapidly. Under most circumstances, the reaction temperature does not raise above 120° C. It is advisable, but not absolutely necessary, to select reaction conditions in order to avoid the reaction mixture being heated to temperatures of above 150° C.

While ammonia is the preferred gaseous neutralization agent, other organic amines having 1 to 3 carbon atoms which are normally gaseous at 35° C. can be employed. Among these organic amines can be mentioned:

|  | Boiling point, ° C. |
|---|---|
| Monomethylamine | 6.5 |
| Dimethylamine | 7.0 |
| Trimethylamine | 3.0 |
| Monoethylamine | 17.0 |
| Isopropylamine | 34.0 |

Preferably monomethylamine or ammonia are employed as the gaseous neutralization agents.

The partially neutralized sulfuric acid esters of the invention are anhydrous, fully concentrated, liquid materials which are stable for over ten weeks under normal storage conditions and normally for over two weeks when stored at 40° C. The unneutralized sulfuric acid esters of polyoxylated alcohols commence to hydorlyze after two weeks of normal storage or 2 to 3 days when stored at 40° C. Since the partially neutralized esters are liquid they are easier to ship and process. Moreover, the liquid partially neutralized esters are easier to compound in detergent formulations and are fully compatible with alkaline bases such as the alkanolamides and alkanolamines. Care, however, should be taken to avoid introduction of moisture into the liquid, partially neutralized sulfuric acid esters produced by the process of the invention during storage as this promotes hydrolysis.

The following specific embodiments are illustrative of the process of the invention. It is to be understood, however, that they are not to be deemed limitative in any manner.

Example 1

1648 gm. (4.0 mols) of the sulfuric acid ester of a primary alkonol ethoxylate containing from 10 to 14 carbon atoms in the alcohol moiety and an average of 3 oxyethylene units (M.W.=410) (the sulfuric acid ester of "Alfonic 1014–4") was aired for a few minutes to remove gaseous HCl therefrom as much as possible at a temperature of 40° C. Thereafter 11 gm. (0.65 mols) of gaseous ammonia were introduced therein over a period of three minutes under good agitation and without cooling. The temperature of the mixture rose to about 75° C. due to the exothermic reaction. The reaction product, about 16.2% neutralized, was a dark brown, free-flowing liquid at room temperature which remained stable at room temperature for four to six weeks without noticeable hydrolysis. The product had the following analysis.

Fatty alcohol ethoxylate sulfate based on the equivalent molecular weight of:

|  | Percent |
|---|---|
| 410 (FAS) | 95 |
| Unsulfated alcohols (US) | 3.4 |
| Chloride | 0.25 |
| Inorganic sulfate (IS) | 2.4 |

A 24% active coposition for incorporation into a detergent formulation was produced by adding 330 parts of the above partially neutralized sulfate to a mixture of 622 parts of water and 48 parts of a 50% aqueous sodium hydroxide solution while maintaining a reaction temperature below 38° C.

A 34% active detergent blend was produced by adding 5 parts of the above partially neutralized sulfate to a mixture of 40 parts of a 60% lauryl alcohol sulfate, 5 parts of a diethanolamide condensate with a short chain fatty acid ("Stanamid"), 47.5 parts of water and 5.0 parts of ammonia (28%) under good agitation at a temperature maintained below 40° C.

Example 2

4.0 mols of a slufuric acid ester of a fatty alcohol ethoxylate containing a range of fatty alcohols from 12 to 16 carbon atoms and an average of 3 oxyethylene units was processed similarly as in Example 1 with 13.5 gm. of gaseous ammonia (20% neutralized). A brown, free-flowing liquid was produced having essentially the same characteristics as that of Exmaple 1.

Examples 3 to 18

These examples were run in the following manner:

4 mols of "Alfonic 1014-4" sulfate were charged into a 3-neck reactor flask. A stream of air was passed through the reaction mixture for five minutes to remove HCl gas at temperatures of 27° to 45° C. Then varying amounts of gaseous ammonia was introduced over varying periods. The amount of absorbed ammonia was determined by weighing. Thereafter the product was cooled and analyzed. Aliquots of the various products were held for varying periods at room temperature and in an oven maintained at 40° C. and analyzed periodically in order to determine the amount of product hydrolysis. For comparison, a sample of the unneutralized alcohol ethoxylate sulfate was also run simultaneously. Table I gives the reaction conditions and Table II gives the stability results of the partially neutralized acids produced.

TABLE I

| Example | Absorbed NH₃ Amt., gms. | Absorbed NH₃ Percent of theor. | Time of absorption min. | Temp. range, ° C. | Physical state | FAS, percent |
|---|---|---|---|---|---|---|
| 3 | 5 | 7.4 | 1 | 43-73 | Liquid | 98.9 |
| 4 | 9 | 13.3 | 6 | 43-75 | ...do | 97.2 |
| 5 | 10 | 14.7 | 2 | 45-93 | ...do | 97.0 |
| 6 | 17 | 25.0 | 10 | 43-85 | ...do | 95.8 |
| 7 | 20 | 29.4 | 2 | 41-105 | ...do | 92.5 |
| 8 | 21 | 30.9 | 15 | 42-90 | ...do | 94.4 |
| 9 | 25 | 36.8 | 7 | 30-104 | Viscous liquid. | 91.6 |
| 10 | 33 | 48.5 | 20 | 40-111 | ...do | 91.2 |
| 11 | 35 | 51.5 | 3 | 35-125 | ...do | 88.9 |
| 12 | 35 | 51.5 | 3 | 32-115 | ...do | 88.1 |
| 13 | 37 | 54.4 | 25 | 36-114 | ...do | 90.1 |
| 14 | 48 | 70.6 | 20 | 42-90 | Paste | (¹) |
| 15 | 51 | 75.0 | 16 | 34-109 | ...do | (¹) |
| 16 | 70 | 103.0 | 34 | 27-138 | ...do | (¹) |
| 17 | 70 | 103.0 | 32 | 30-155 | ...do | (¹) |
| 18 | 71 | 104.5 | 32 | 30-120 | ...do | (¹) |

¹ Not analyzed.

TABLE II

| Example | NH₃ percent of theoretical | Initial FAS | FAS on storage at room temperature Days 2-3 | 14 | 27-28 | 37 | 41 | Percent of deterioration after 37-41 days | FAS on storage at 40° C. Days 3 | 8 | 11-12 | 14 | 18 | 26 | Percent of deterioration after 18-26 days at 40° C. |
|---|---|---|---|---|---|---|---|---|---|---|---|---|---|---|---|
| Comparison | 0 | 96.4 | | | 89.2 | 85.3 | | 11.5 | | | | | | | 18.1 |
| 3 | 7.4 | 98.9 | | 95.1 | | | 95.0 | 4.0 | 92.6 | | 88.8 | | 81.0 | | 11.9 |
| 4 | 13.3 | 97.2 | | | | | | | | 95.2 | | 93.6 | | 85.6 | 11.6 |
| 5 | 14.7 | 97.0 | | 94.7 | | | 94.7 | 2.4 | 94.7 | | 89.9 | | 85.8 | | 10.5 |
| 6 | 25.0 | 95.8 | | | | | | | | 92.7 | | 91.1 | | 84.1 | 5.3 |
| 7 | 29.4 | 92.5 | | 90.7 | | | 90.7 | 1.9 | 91.6 | | 87.5 | | 87.6 | | 9.4 |
| 8 | 30.9 | 94.4 | | 94.2 | | | | | | 91.2 | | 90.4 | | 85.5 | 8.6 |
| 9 | 36.8 | 91.6 | 90.1 | | 89.4 | | 89.1 | 1.6 | 89.8 | 89.4 | 87.8 | | | 83.7 | 4.8 |
| 10 | 48.5 | 91.2 | | | | | | | | 91.0 | | 90.5 | | 85.5 | 3.7 |
| 11 | 51.5 | 88.9 | | 87.3 | | | 87.0 | 2.1 | 87.6 | | 86.6 | | 85.6 | | 2.8 |
| 12 | 51.5 | 88.1 | | 87.4 | | | 87.0 | 1.2 | 87.5 | | 86.6 | | 85.6 | | 2.3 |
| 13 | 54.4 | 90.1 | | | | | 89.9 | 0.2 | | 90.0 | | 89.7 | | 88.0 | |

The percent of deterioration was determined by dividing the decrease in FAS content over the period given by the initial FAS content and multiplying the fraction by 100 to get the percent.

From Table I, it can be ascertained that above 55% neutralization a paste type product is produced.

From Table II, it can be ascertained that between a 10% to 55% partial neutralization, the percentage of deterioration of the partially neutralized sulfate on standing at room temperature for five to six weeks is below 2.5% and on standing at 40° C. for three to four weeks, this deterioration is below 12%.

Examples 19 to 22

These examples were run following the same procedures of Examples 3 to 18 utilizing varying amounts of gaseous ammonia for neutralization. Tables III and IV report the results obtained similarly as Tables I and II.

TABLE III

| Example | Absorbed NH³ Amt., gms. | Absorbed NH³ Percent of theor. | Time of absorption, min. | Temp. range, ° C. | FAS percent |
|---|---|---|---|---|---|
| 19 | 13 | 19.2 | 5 | 36-63 | 94.2 |
| 20 | 17 | 25.0 | 7 | 25-70 | 93.9 |
| 21 | 20 | 29.4 | 8 | 28-80 | 95.0 |
| 22 | 27 | 39.7 | 10 | 23-95 | 93.6 |

TABLE IV

| Example | NH percent of theoretical | Initial FAS | FAS on storage at room temperature Days 11 | 18 | 56 | Percent of deterioration after 56 days | FAS on strage at 45° C. Days 11 | 29 | 59 | Percent of deterioration after— 29 | 56 days |
|---|---|---|---|---|---|---|---|---|---|---|---|
| Comparison | 0 | 94.0 | 92.9 | 89.7 | 84.9 | 9.7 | | | | | 31.2 |
| 19 | 19.2 | 94.2 | 94.3 | 93.9 | 93.7 | 0.5 | 87.3 | 78.4 | 64.8 | 16.8 | 31.2 |
| 20 | 25.0 | 93.9 | 93.8 | 92.8 | 92.2 | 1.8 | 89.9 | 84.7 | 75.7 | 9.8 | 19.5 |
| 21 | 29.4 | 95.0 | 94.0 | 94.3 | 94.0 | 1.1 | 89.4 | 84.0 | 75.7 | 11.6 | 20.3 |
| 22 | 39.7 | 93.6 | 92.0 | 92.1 | 92.0 | 1.7 | 86.2 | 82.0 | 75.5 | 12.4 | 19.2 |

The products were all dark amber liquids. From Table IV, it can be ascertained that the partially neutralized sulfates were practically free from hydrolysis on standing for 8 weeks at room temperature. Moreover they were quite stable on standing for 4 weeks in an oven at 45° C.

Example 23

As a comparison, an "Alfonic 1014–4" sulfate ester unneutralized was compared with an aliquot of the same ester 16.2% partially neutralized with gaseous ammonia by the process of the invention. After 8 days of standing at room temperature, the unneutralized sulfate ester had a percentage of deterioration as measured above of 2.6% and after 8 days of standing at 40° C., the unneutralized sulfate ester had a percentage of deterioration of 22.0%. The 16.2% partially neutralized sulfate ester on standing for 8 days at 40° C. had a percentage of deterioration of 2.6%.

Example 24

1640 gms. (4.0 mols) of the sulfuric acid ester of a primary alkanol ethoxylate ("Alfonic 1014–4"), prepared by reacting the alcohol ethoxylate with a slight excess of anhydrous chlorosulfonic acid at 25° to 35° C., was placed in a 3 neck reaction flask. Air was allowed to bubble therethrough for 5 minutes under agitation in order to remove residual hydrochloric acid. Thereafter over a period of 3 minutes 13 gms. of gaseous monomethylamine was introduced under agitation without cooling. The reaction product, about 10.4% neutralized, was a brown, free-flowing liquid at room temperature which remain quite stable at room temperature. It had the following analysis:

| | Percent |
|---|---|
| FAS | 91.8 |
| US | 5.3 |
| Chloride | 0.6 |
| IS | 3.3 |

After storage for 5 days at room temperature, the product contained 91.3% FAS for a percentage of deterioration of 0.5%. After storage for 5 days at 40° C., the product contained 86.7% FAS for a percentage of deterioration of 5.5%.

The preceding specific embodiments are illustrative of the process of the invention. It is to be understood, however, that other expedients known to those skilled in the art can be employed without departing from the spirit of the invention or the scope of the appended claims.

I claim:

1. Partially neutralized liquid sulfuric acid esters of ethoxylated alcohols having improved stability produced by the process which consists essentially of adding in gaseous form from about 10% to about 55% of the theoretical for neutralization of an anhydrous neutralizing agent selected from the group consisting of ammonia and alkyl amines having 1 to 3 carbon atoms and being gaseous at a temperature of 35° C. to an anhydrous liquid sulfuric acid ester of an ethoxylated alcohol selected from the group consisting of (1) compounds of the formula $$R-CH_2-O-(CH_2-CH_2-O)_n-SO_3H$$

(2) compounds of the formula $$R'-O-(CH_2-CH_2-O)_n-SO_3H$$

(3) compounds of the formula $$\begin{array}{c}R_1-CH-R_2\\|\\O-(CH_2-CH_2-O)_n-SO_3H\end{array}$$

and (4) mixtures of the above;

wherein R represents a member selected from the group consisting of alkyl having from 5 to 19 carbon atoms, alkenyl having from 5 to 19 carbon atoms, and hydroxyalkyl having from 5 to 19 carbon atoms; R' represents a member selected from the group consisting of alkylphenol having from 7 to 24 carbon atoms and alkylnaphthol having from 11 to 24 carbon atoms; $R_1$ and $R_2$ represent alkyl having from 1 to 18 carbon atoms and the total of the carbon atoms in $R_1$ and $R_2$ is from 5 to 19; and $n$ represent an integer having an average value of from 2 to 6; at a temperature below 125° C.

2. The product of claim 1 wherein, in said process, said anhydrous neutralizing agent is ammonia.

3. The product of claim 1 wherein, in said process, said anhydrous neutralizing agent is monomethylamine.

4. The product of claim 1 wherein, in said process, said anhydrous sulfuric acid ester of an ethoxylated alcohol is an alkanol ethoxylated sulfate of the formula $$R_3-O-(CH_2-CH_2-O)_3-SO_3H$$

wherein $R_3$ is alkyl having from 10 to 18 carbon atoms.

References Cited

UNITED STATES PATENTS 3,305,577  2/1967  Goldann et al. ____ 260—458X
3,054,820  9/1962  De Jong et al. _____ 260—458

LEON ZITVER, Primary Examiner

L. DECRESCENTE, Assistant Examiner

U.S. Cl. X.R.

252—161; 260—458